UNITED STATES PATENT OFFICE.

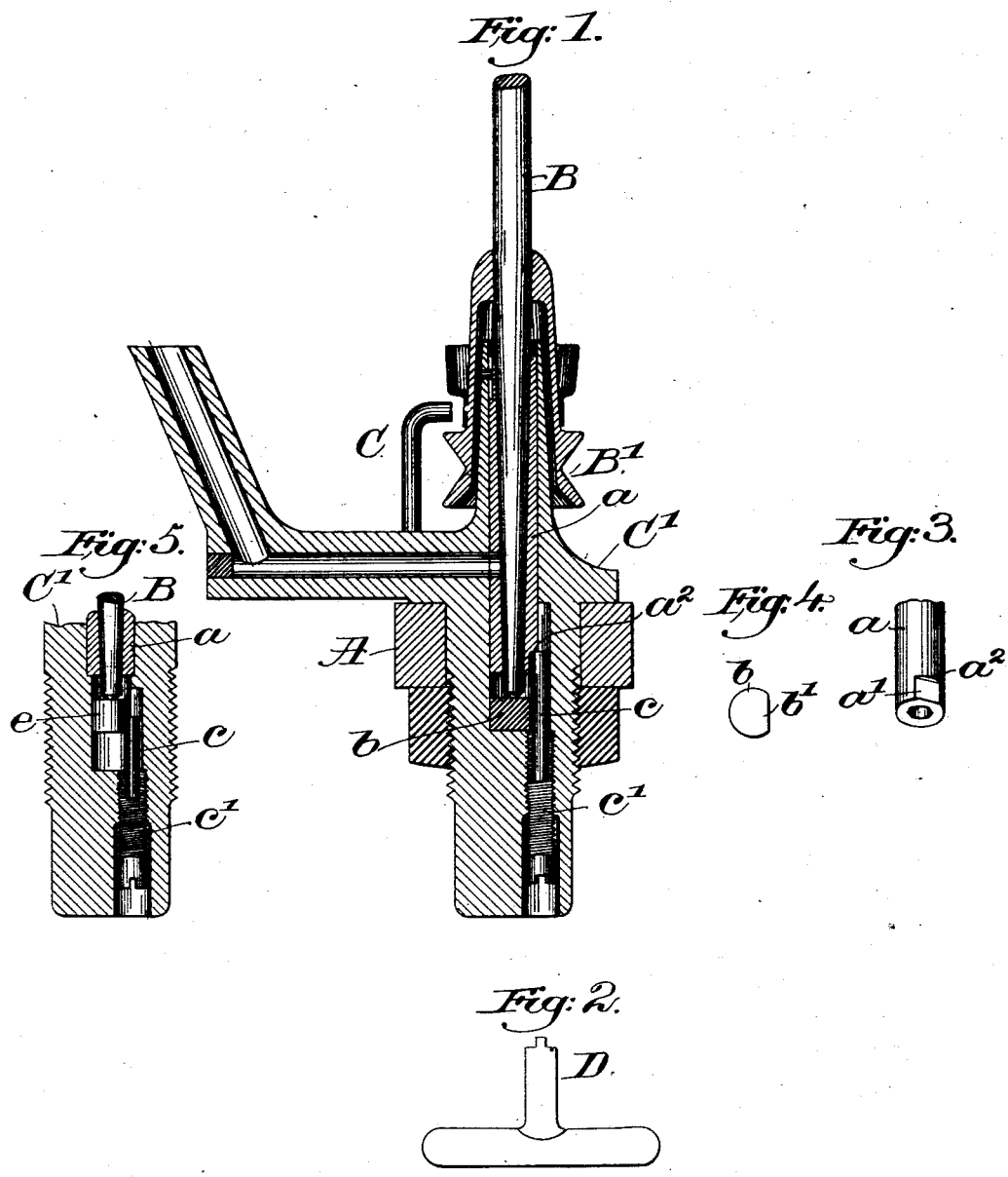

GEORGE O. DRAPER, OF HOPEDALE, MASSACHUSETTS, ASSIGNOR TO GEORGE DRAPER & SONS, OF SAME PLACE.

SPINDLE-BEARING-ADJUSTING DEVICE.

SPECIFICATION forming part of Letters Patent No. 525,453, dated September 4, 1894.

Application filed May 21, 1894. Serial No. 511,922. (No model.)

*To all whom it may concern:*

Be it known that I, GEORGE O. DRAPER, of Hopedale, county of Worcester, State of Massachusetts, have invented an Improvement in Spindle-Bearing-Adjusting Devices, of which the following description, in connection with the accompanying drawings, is a specification, like letters on the drawings representing like parts.

In spinning and twisting machines having tapered pintles running in tapered bearings, it is of great importance for the proper running of the spindle, that the pintle fit its bearing correctly, and to insure this and maintain a correct fit notwithstanding wear of the parts, means have to be provided whereby the bearing may be adjusted as required, and numerous devices have been made for this purpose. I have devised novel means for this purpose having marked advantages, especially as to simplicity and efficiency, over other earlier devices known to me, and my novel devices have such construction, and they are so combined, one with the other, that the one and the same screw may be used not only to adjust the lateral bearing vertically with relation to the spindle while the latter is running, but also to restrain the rotation of the bearing in the supporting-case.

Heretofore in this class of spindle and bearing most extensively in use it has been customary to connect the lateral bearing and step by a screw or device, so that the rotation of the bearing or of the step, one with relation to the other, would enable the lateral bearing to be raised or lowered.

In accordance with my invention, the lateral bearing rests on the end of a vertically moving rod, shown as threaded, the head of the threaded portion being exposed through the supporting-case to be engaged by a suitable wrench. The rod does not need to be threaded where it engages the lateral bearing, but simply acts against a shoulder or portion of the bearing, and the bearing is so notched or slabbed as to enable the rod, located eccentrically with relation to the center of rotation of the spindle, to restrain the rotation of the bearing. The rod may also restrain the rotation of the step, yet both the lateral bearing and the step may be readily removed, if desired, entirely from the spindle, without disturbing the bearing adjusting device.

Figure 1 in vertical section represents a spindle bearing provided with my novel adjusting device. Fig. 2 shows one form of wrench, detached. Fig. 3 shows the lower end of the lateral bearing, detached. Fig. 4 shows the top or plan view of the step, detached. Fig. 5 is a modification to be described.

Referring to the drawings, A, represents a spindle rail; B a spindle having a sleeve whirl B' of usual construction, said spindle being prevented from rising by means of a hook or device C, connected with the supporting-case containing the bolster bearing $a$ and the step $b$ to be described.

In accordance with my invention as herein illustrated, I slab or cut off a part of the bolster bearing near its lower end, so as to leave a surface $a'$ and a shoulder $a^2$ above it; and I cut off one edge of the step $b$, as at $b'$, so as to afford an opportunity at the step for the passage above it of the rod $c$ which constitutes the bearing adjusting device, said rod, as I have herein chosen to illustrate my invention, being located in the supporting-case eccentrically with relation to the center of rotation of the spindle B, and being under the control of a screw $c'$, shown as adapted to fit screw threads cut in the supporting-case, rotation of said screw effecting vertical movement of the rod or bearing adjusting device.

The upper end of the rod rests against the shoulder $a^2$, and the operation of adjusting the bearing vertically would be just the same if the said rod rested against any portion of the lower end of the said bearing; but to make the said rod perform a double purpose, it is preferable that it contact with the shoulder of the bearing, so as to leave a portion $a'$ against which the rod may act just below its upper end to restrain the rotation of the bolster bearing with the spindle.

The screw $c'$ has its head exposed to be engaged through a hole cut in the supporting-case, and the head of the screw is of such shape as to be readily engaged by a suitable wrench or key D, so that it is only necessary to rotate the screw c' when it is desired to raise or lower the bolster bearing, and this without at all interfering with the running of the machine at speed; and yet, if at any time, and for any reason, it is desirable to remove the bolster bearing, or step, or both, this may be readily done without at all disturbing the position of the adjusting device.

I have so far described the maintenance of correct fit between the tapered pintle of the spindle and the tapered bolster bearing by the vertical movement of the bolster bearing, but it is obvious that should the bolster be mounted upon a stationary support and the rod c be made to act directly upon the step, or a shoulder cut in the step e, as provided for with relation to the bolster bearing, that the said step might be adjusted, vertically with relation to the lateral bearing and thereby lift the spindle vertically to provide for the correct fit between the pintle of the spindle and its lateral bearing. This modification is represented in Fig. 5.

While I prefer to effect the lateral adjustment of the rod referred to, by or through the screw c', yet this invention is not limited to the exact construction represented by the rod and screw, as the construction might be modified and yet attain the same results; and to prevent oil escaping from the bolster case, the threads of the screw may fit the screw threads of the bolster case substantially oil-tight.

In my invention the supporting case containing the lateral bearing is not made vertically adjustable in the rail.

Having described my invention, what I claim, and desire to secure by Letters Patent, is—

1. The combination with a supporting case adapted to be fixed in a spindle rail, and a bolster bearing contained in said case and tapered internally, of a vertically adjustable rod having its upper end wholly within the supporting case, and a step, the movement of the rod vertically effecting a relative vertical change of position between the bolster bearing and the spindle step to thereby alter the relative fit between the spindle and bolster, substantially as described.

2. A supporting case, having an internally tapered lateral bearing mounted loosely in the chamber of said case and provided with a shoulder, and a rod located within said supporting case and abutting against said bearing, combined with a screw extending into the supporting case to effect the vertical adjustment of said rod and of said lateral bearing, substantially as described.

3. A supporting case having an internally tapered loose lateral bearing provided with a surface a' near its lower end and a step having a surface b', combined with a vertically adjustable rod contained within said supporting case and entering the space or chamber thereof and cooperating with said surfaces a', b', to restrain the rotation of both the lateral bearing and the step in the supporting case, substantially as described.

In testimony whereof I have signed my name to this specification in the presence of two subscribing witnesses.

GEORGE O. DRAPER.

Witnesses:
GEO. W. GREGORY,
M. J. SHERIDAN.